US010853845B2

(12) United States Patent
Herkert et al.

(10) Patent No.: US 10,853,845 B2
(45) Date of Patent: Dec. 1, 2020

(54) SECURELY MANAGING TRANSACTIONAL HISTORY FOR TARGETED CONTENT

(71) Applicant: Verizon Patent and Licensing Inc., Arlington, VA (US)

(72) Inventors: Arthur Gerald Herkert, Millington, NJ (US); Brigitte Bastaldo-Tsampalis, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 681 days.

(21) Appl. No.: 14/332,932

(22) Filed: Jul. 16, 2014

(65) Prior Publication Data

US 2016/0019574 A1  Jan. 21, 2016

(51) Int. Cl.
*G06Q 30/02* (2012.01)
(52) U.S. Cl.
CPC ..... *G06Q 30/0267* (2013.01); *G06Q 30/0221* (2013.01); *G06Q 30/0225* (2013.01); *G06Q 2220/10* (2013.01)
(58) Field of Classification Search
CPC . G06Q 30/0207–0277; G06Q 30/0267; G06Q 30/0225; G06Q 30/0221
USPC ..................................................... 705/14.26
See application file for complete search history.

(56) References Cited

U.S. PATENT DOCUMENTS

| 5,903,880 | A | * | 5/1999 | Biffar | ..................... | G06Q 20/06 235/379 |
| 2008/0065878 | A1 | * | 3/2008 | Hutson | ................. | H04L 9/3247 713/153 |
| 2011/0231645 | A1 | * | 9/2011 | Thomas | .................. | H04L 9/321 713/150 |
| 2012/0210134 | A1 | * | 8/2012 | Mitter | .................. | H04L 9/0825 713/171 |
| 2013/0073859 | A1 | * | 3/2013 | Carlson | ................. | H04L 9/3247 713/176 |

OTHER PUBLICATIONS

Modiv media introduces industry's first mobile-social coupon sharing feature. (Feb. 13, 2012). Business Wire. Retrieved on Aug. 3, 2020. Retrieved from: <URL:https://dialog.proquest.com/professional/docview/921179090?accountid=131444 >. (Year: 2012).*

* cited by examiner

*Primary Examiner* — Abhishek Vyas
*Assistant Examiner* — Monica A Mandel

(57) ABSTRACT

Mobile devices and servers that securely manage transactional history for targeted content are described. A content originator generates a secure content package for the targeted content and delivers the package to a trusted service manager (TSM). The TSM delivers the package to a first mobile device. The first mobile device presents the package for redemption and/or transfers the package to one or more additional mobile devices. Prior to presentment or transfer, the first mobile device updates a secure history container of the package to include a unique identifier of the first mobile device and a corresponding authentication token. When the package is presented for redemption, the TSM validates the package and authenticates the secure history container. The TSM delivers the authenticated secure history container to the content originator as a record of the redemption.

20 Claims, 5 Drawing Sheets

US 10,853,845 B2

SECURELY MANAGING TRANSACTIONAL HISTORY FOR TARGETED CONTENT

BACKGROUND

In recent years, the popularity of smart mobile devices, such as smartphones and tablets, has exploded. Businesses, retailers, advertisers and marketers continue to develop strategies to deliver targeted advertising, offers and other content to particular consumers viewed as high value to the content originators.

Content originators develop strategies and campaigns to increase consumption of specific products and services by identifying advertising, offer, and/or content targets; setting goals for the content campaign; selecting the content venue; selecting and distributing the content to the targets through the venues; and tracking the uptake or redemption of the content. Content originators, however, may not be able to effectively track "who" is responding to these campaigns and quantify their effectiveness.

A content originator (e.g., business, retailer, advertiser, marketer, etc.) may develop targeted content (e.g., advertisement, offer, or other content) for distribution to targeted consumers and subsequent redemption. In order to improve the rate of redemption of future targeted content, past targeted content redemption rates and the corresponding past targeted content are reviewed to determine factors in the success or failure of the past targeted content. Individualized information, however, is often unavailable. For example, content originators are often unable to determine exactly which targeted consumer redeemed which targeted content. Furthermore, if targeted content was passed from one recipient to another before redemption, the content originator may be unable to identify people who redistributed the targeted content along the path to redemption. As such, content originators are less effective at developing targeted content that will improve redemption by the targeted consumer.

As smart mobile devices proliferate and capabilities of these smart mobile devices increase, content originators are exploring opportunities to quantitatively measure and improve the efficiency of various targeted content campaign techniques involving distribution to such devices. As recognized by the present inventors, what is needed, therefore, is a way to track "who" is responding to targeted content and how the targeted content is being distributed. Furthermore, we submit that a need exists to validate targeted content when presented for redemption as well as authenticate a transactional history associated with the targeted content.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
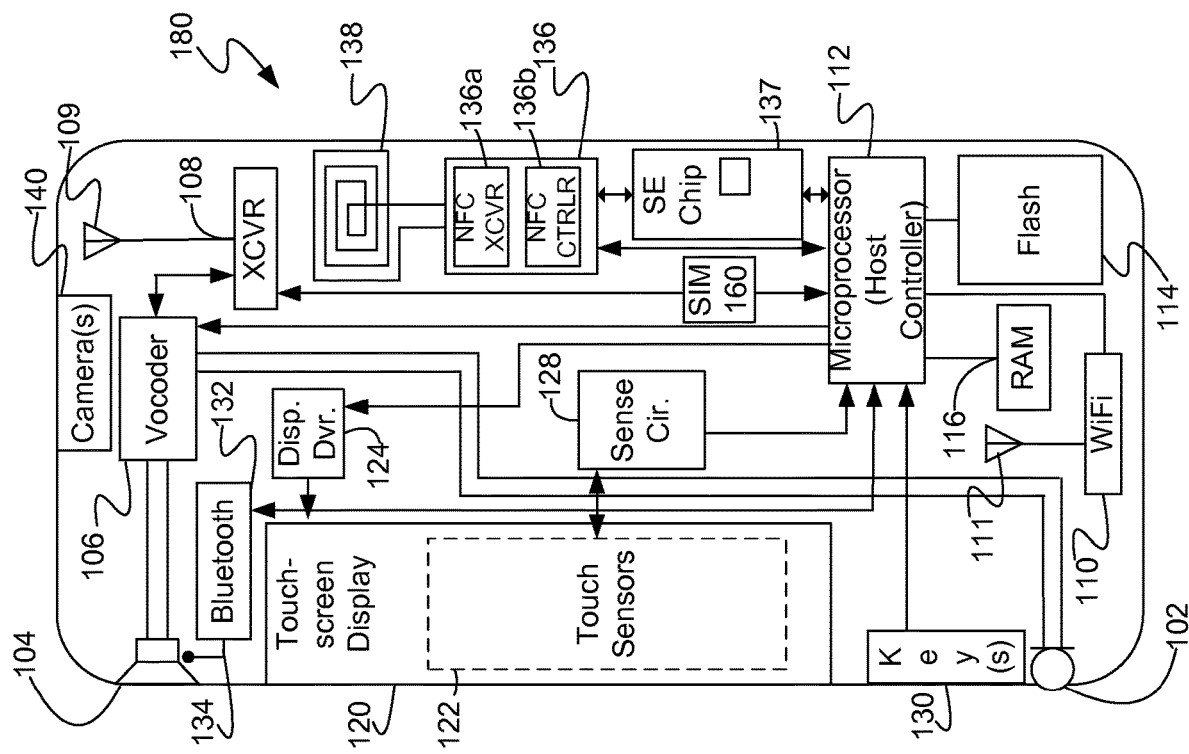
FIG. 1 provides a block diagram illustration of an example of a mobile device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to securely managing a transactional history for targeted content. The transactional history may include a unique identifier corresponding to each mobile device involved in one or more transactions related to the targeted content and such transactional history may be provided to a content originator, e.g. upon content redemption, as a record of the one or more transactions.

In one example, a content originator develops content and delivers the content to a Trusted Service Manager (TSM) in a content package. The TSM is a server within a mobile wireless communication network that can securely communicate with mobile devices. The TSM, in this example, signs the content package and delivers the signed content package to a first mobile device. The first mobile device stores the signed content package in a secure element of the mobile device, such as a user identity module (e.g., subscriber identity module (SIM)) or trusted execution environment (TEE). The first mobile device may then redeem the content and/or transfer the signed content package to one or more additional mobile devices after updating a secure history container of the signed content package with a unique identifier of the first mobile device. Such content transfer may be initiated by either the first mobile device (e.g., pushed) or the one or more additional mobile devices (e.g., pulled). As the additional mobile devices also transfer the signed content package to other mobile devices, each mobile device from which content is transferred updates the secure history container to include its respective unique identifier before completing the content transfer.

When the signed content package is presented for redemption, the TSM validates the signed content package and authenticates the secure history container. Validation, in one example, involves the TSM generating a new signature corresponding to the content package being presented for redemption and comparing the new signature with the signature contained within the signed content package. Alternatively, the signature from the signed content package being presented for redemption may be compared with a copy of the original signature generated by the TSM. In either example, if the two signatures match, the presented signed content package is valid and the related redemption should be allowed to proceed. If the two signatures do not match, the presented signed content package may not be valid and the related redemption may be stalled, cancelled and/or otherwise interrupted.

In a further specific detailed example, the TSM authenticates entries in the secure history container and thus the unique identifier of mobile devices that handled the content package. Such authentication is performed, for example, for each entry in the secure history container. Alternatively, only select entries (e.g., first, last, first and last, some random selection, etc.) are authenticated. In one example, authentication is based on comparing hashes related to each unique identifier (e.g., compare hash of unique identifier generated when signed content package is presented for redemption with hash generated when signed content package was transferred and included in secure history container). As with validation above, authentication may influence whether a redemption occurs or is stalled, cancelled and/or otherwise interrupted. The TSM, after validating the signed content package and authenticating the secure history container, then provides the secure history container to the content originator as a record of the redemption. In this way, the content originator may better track which content is being redeemed by which devices and how the content is being distributed by mobile devices, thus improving the content originator's ability to develop more effective content.

Reference now is made in detail to the examples illustrated in the accompanying drawings and discussed below. FIG. 1 illustrates an example of a mobile device 180 that facilitates the transfer and redemption of a secure content package. The mobile device 180 includes elements and programming to offer the user a wide range of device functions, many of which involve communication. Some of those elements/functions support targeted content distribution, history management and redemption, although other elements/functions remain available for other device uses.

The mobile device 180 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 1, mobile device 180 includes at least one digital transceiver (XCVR) 108, for digital wireless communications via a wide area wireless mobile communication network, although the mobile device 180 may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 108 provides two-way wireless communication of information including digitized audio signals, still image and/or video signals, web page information for display as well as web related inputs, and various types of mobile message communications to/from the mobile device 180. In particular, such information may represent the targeted content in any one or some combination of these formats. For example, mobile device 180 receives the targeted content included in or attached to a message (e.g., e-mail or text message) from the TSM 228 via transceiver 108 and mobile device 180 sends the targeted content to another mobile device included in or attached to another message (e.g., e-mail or text message) via transceiver 108.

In one example, the transceiver 108 sends and receives a variety of signaling messages in support of various voice and data services provided by a network of a wireless service provider, to a user of mobile device 180 via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS), and/or multimedia messaging service (MMS). The network permits such communications of device 180 because device 180 has been activated on an account with the network.

Many modern mobile devices also support wireless local area network communications over Wi-Fi, instead of or in addition to data communications using the wide area mobile communication network. Hence, in the example of FIG. 1, for packet data communications, the exemplary mobile device 180 may also include a Wi-Fi transceiver 110 and associated antenna 111. Although Wi-Fi is used here as the example, the transceiver 110 may take the form of any available two-way wireless local area network transceiver of a type that is compatible with one or more standard protocols of communication implemented in wireless local area networks, such as one of the Wi-Fi standards under IEEE 802.11 and/or WiMAX. The transceiver 110, for example, may provide two-way data transport for wireless communication with a wireless access point in a residence or enterprise that the user frequents or with any available hotspot offered in a public venue. For example, transceiver 110 allows mobile device 180 to transfer a secure content package to one or more additional mobile devices, as described further below. Although communicating through a different network or networks, the transceiver 110 supports various types of data communications similar to the packet data communications supported via the mobile network transceiver 108.

The mobile device 180 further includes a microprocessor, sometimes referred to herein as the host processor 112. A processor is a circuit having elements structured and arranged to perform one or more processing functions, typically various data processing functions. Although discrete logic components could be used, the examples utilize components forming a programmable central processing unit (CPU). A microprocessor for example, includes one or more integrated circuit (IC) chips incorporating the electronic elements to perform the functions of the CPU. The processor 112, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in server computers (e.g. FIG. 5) or other user terminal computer equipment (e.g. FIG. 6).

Returning more specifically to the mobile device example of FIG. 1, the microprocessor 112 serves as the programmable controller for mobile device 180 by configuring mobile device 180 to perform various operations, for example, in accordance with instructions or programming executable by processor 112. For example, such operations may include various general operations of the mobile device 180 as well as operations related to receiving and redistributing targeted content, updating history containers of secure content packages and redeeming targeted content. Although a processor may be configured by use of hardwired logic, typical processors in mobile devices are general processing circuits configured by execution of programming.

Depending on the type of device, the mobile device 180 stores and runs an operating system through which specific applications may be run on the device. Examples of operating systems include Android, Apple iOS (iPhone or iPad devices), Windows Mobile, RIM BlackBerry operating system, or the like. Program controlled operations, for example, may include various general operations of the mobile device 180 as well as operations related to the receipt, transfer and/or presentation for redemption of a secure content package, as described in greater detail herein. A flash memory 114 is used to store, for example, programming or instructions for execution by the processor 112. Flash memory 114 may also be used to store mobile configuration settings for different mobile applications or services executable at mobile device 180 (using processor 112). Mobile device 180 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with another mobile device and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting the secure management of transactional histories for targeted content under consideration here may include a variety of different types of user interface elements. For discussion purposes, in the smart phone example shown in FIG. 1, the user interface elements of mobile device 180 include a touch screen display 120 (also referred to herein as "touch screen 120" or "display 120"). For output purposes, the touch screen 120 includes a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 180 and keys 130 may correspond to the physical keys of such a keyboard. Alternatively, some or all of the keys 130 (and keyboard) of mobile device 180 may be implemented as "soft keys" of a virtual keyboard graphically represented in an appropriate arrangement via touch screen display 120. The soft keys presented on the touch screen display 120 may allow the user of mobile device 180 to invoke the same user interface functions as with the physical hardware keys. In some implementations, the microphone 102 and speaker 104 may be used as additional user interface elements, for audio input and output, including with respect to some functions related to the distribution, transfer and/or redemption of targeted content, as described herein.

In addition, mobile device 180 has one or more image capture sensors 140 (e.g., camera(s)) to capture images for further processing by microprocessor 112. Such captured images may serve as input and thus, camera(s) 140 serves as an additional user input element for mobile device 180. For example, camera(s) 140 is utilized to capture targeted content as part of transferring the targeted content, as described in greater detail below.

For output, touch screen display 120 is used to present information (e.g., text, video, graphics or other visible content) to the user of mobile device 180. Host processor 112 controls visible display output on the LCD or other display element of the touch screen display 120 via a display driver 124, to present the various visible outputs to the device user.

In general, touch screen display 120 and touch sensors 122 (and one or more keys 130, if included) are used to provide the textual and graphical user interface for the mobile device 180. In an example, touch screen display 120 provides viewable content, such as targeted content available for redemption and/or transfer, to the user at mobile device 180. Touch screen display 120 also enables the user to interact directly with the viewable content provided in the content display area, typically by touching the surface of the screen with a finger or an implement such as a stylus. For example, a user of mobile device 180 interacts with display 120 to select targeted content and present the targeted content for redemption, as discussed further below. Of note, when activation processing calls for user input, the touch screen display and/or voice input via microphone 102 may facilitate such input, e.g. in response to device outputs of appropriate prompts.

As shown in FIG. 1, the mobile device 180 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The user interface capabilities of the mobile device 180 provide output to and receive input from the user of the mobile device 180, for any of the various functions, operations or applications of the device. For example, programming (discussed more later) that configures the mobile device 180 to transfer a secure content package to one or more additional mobile devices and/or present the secure content package for redemption may include further acknowledgment requests from the user.

The mobile device 180 also has near-field communication (NFC) communication capability. NFC may be used for a variety of different functions or applications of the mobile device 180 for data communication with various other types of equipment, such as presenting targeted content for redemption at a redemption point and/or transferring targeted content to another mobile device. Some secure content package transfer examples use this NFC communication between devices, e.g. to transfer the secure content package to/from mobile device 180; although such device to device communication via NFC is useful for many other purposes/applications.

NFC is a set of standards for smart phones and similar devices, such as the exemplary mobile device 180 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device or NFC enabled device (e.g., a smart poster, a contactless terminal such as that at a point of sale, etc.) includes a transceiver configured to communicate with other NFC capable equipment.

Hence, the exemplary mobile device 180 further includes an NFC sensor. The NFC sensor may be implemented in a variety of ways. In the exemplary mobile device 180 of FIG. 1, the NFC sensor includes an NFC type radio frequency transceiver 136*a*, which is formed by an NFC chipset 136. The NFC chipset 136 provides two-way wireless communication of information in accordance with NFC technology and protocols. The NFC chipset 136 includes an NFC controller 136*b*. For simplicity, the NFC chipset 136 is sometimes referred to herein as the NFC controller 136, while it will be understood that it is a controller within the NFC chipset 136. The exemplary NFC sensor also includes an antenna, such as coil antenna 138. The NFC chipset 136 of device 180 connects to the NFC coil antenna 138, for transmitting and receiving NFC communications to/from other NFC compatible devices with compatible transceivers over short air link distances. The transceiver 136*a* formed by the NFC chipset 136 also sends and receives a variety of signaling messages for establishing NFC links with other NFC-enabled devices and sends and receives various user data, such as a secure content package, over the established NFC links. The signaling, for example, may allow the transceiver formed by the NFC chipset 136 to detect proximity of another NFC capable device, establish an NFC link with the other device, trigger execution of an appropriate application, such as an application to support the transfer of a secure content package, described below, within the mobile device 180 and send and/or receive data for the secure content package application as between the mobile device 180 and the other NFC capable device. Some modern mobile devices are already coming equipped with such NFC equipment, and increased NFC deployment is expected in the near future.

In order to run secure applications such as securely managing transactional histories for targeted content and the like, there is a secure element (SE). In one example, the SE is a separate SE chip 137 that includes tamperproof storage and execution memory and is configured to communicate with an NFC controller 136*b* (a secure processor). The NFC controller 136*b* is different from the host processor 112 in that it focuses on enabling secure transactions. The SE contains applications (e.g., applets) that use secure keys running inside the secure processor as well as data to be maintained securely (e.g., secure content package, secure history container). For example, there may be at least one applet for processing securely maintained data, such as presenting targeted content at a redemption point and/or transferring targeted content to another mobile device described below. As an additional example, data (e.g., secure history container) securely maintained in the SE is updated, either by the secure processor or host processor 112, to include additional information, such as a unique identifier and corresponding authentication token of mobile device 180, as described further below.

In additional examples, the secure element may be part of a subscriber identification module (SIM) chip, such as SIM 160 described below, or a separate secure element like a secure digital (SD) memory card used for storing and accessing applications and data in a secure manner.

In an additional example, the secure element may be implemented within a trusted execution environment (TEE), not shown. In this additional example, the TEE is a secure element implemented within microprocessor 112 as various secure programming and/or software components of the operating system and/or firmware of mobile device 180.

In the various examples discussed herein, the SE (e.g., SIM 160, SE Chip 137, or TEE) securely stores a secure content package corresponding to targeted content, including any respective secure history container. The SE, in the examples, is also involved in updating the secure history container to include a unique identifier of mobile device 180 and an authentication token corresponding to the unique identifier, as described in greater detail below.

The mobile device 180 in this example also has a short-range transceiver 132 configured to both transmit and receive signals via antenna 134. For example, the short-range transceiver may be a Bluetooth device and may communicate with another mobile device which also has a Bluetooth-enabled short-range transceiver. In one example, the Bluetooth-enabled short-range transceiver 132 of mobile device 180 is paired with a Bluetooth-enabled short-range transceiver of another mobile device and a secure content package is transferred utilizing Bluetooth communications.

Mobile device 180 includes a subscriber identity module (SIM) 160. The SIM 160 is an identity chip or module containing information used to uniquely identify mobile device 180, such as an international mobile equipment identifier (IMEI). A similar module, for example, is sometimes referred to as a Universal Integrated Circuit Card (UICC) and uniquely identified by a UICC identifier (UCCID). Thus, in one example, mobile device 180 is uniquely identified by an IMEI and the identity chip or module is uniquely identified by a UCCID. As an additional example, mobile device 180 is uniquely identified by a mobile directory number (MDN) and/or an international mobile subscriber identity (IMSI). The SIM 160 provides user account information and secure storage, including secure storage for an IMEI and/or a UCCID. The SIM 160 is a computer itself with internal processor and storage elements (not individually shown).

Figure 2:
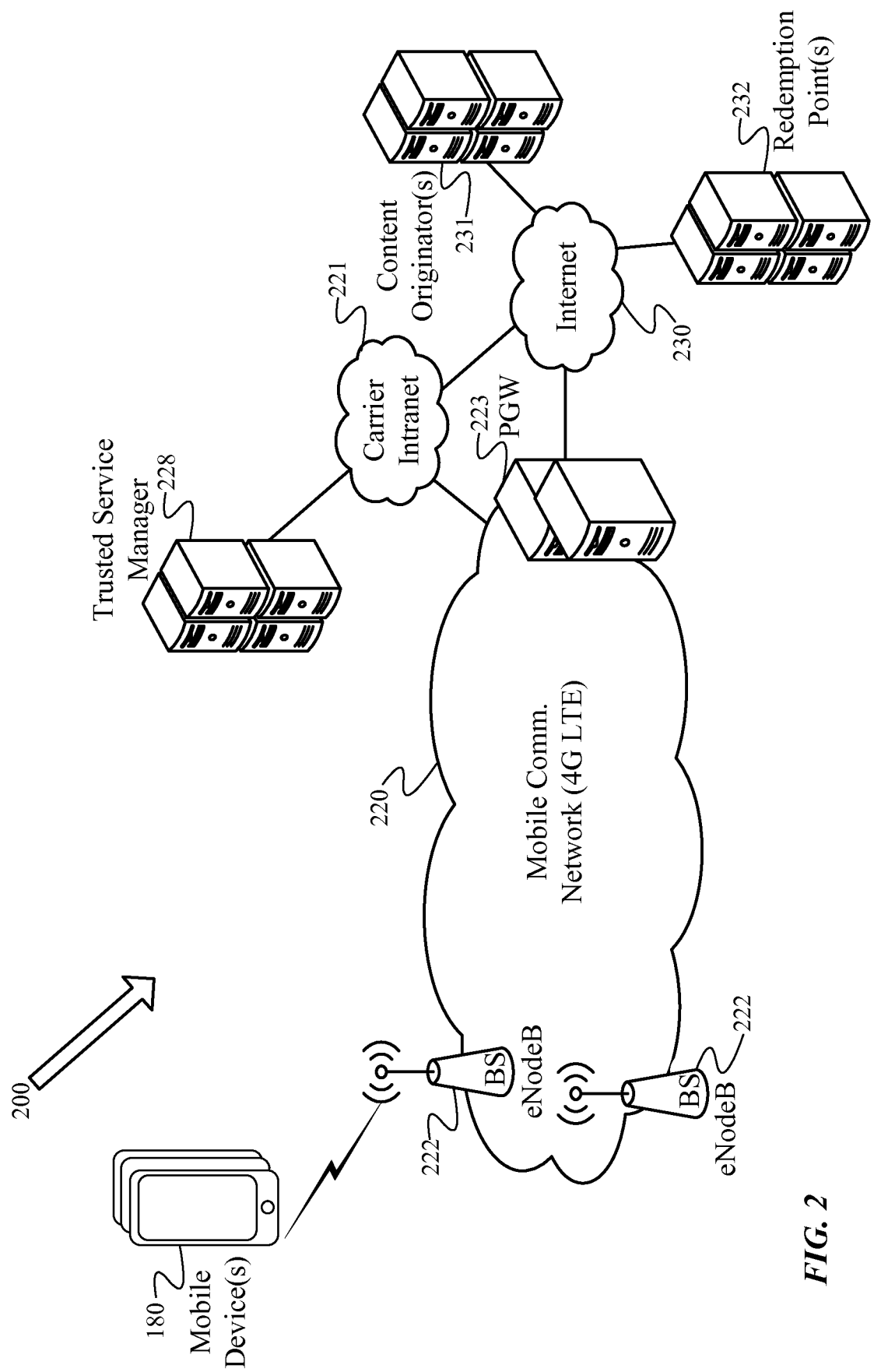
FIG. 2 is a functional block diagram of an example of a communication system, which may implement a method for securely managing transactional histories for targeted content.

FIG. 2 illustrates a functional block diagram of an example of a system 200 that supports various mobile communication services and which may implement a method for securely managing transactional histories for targeted content.

The illustrated system 200 services any number of mobile devices, including the illustrated mobile device 180. Mobile device 180 may be a laptop, a personal digital assistant ("PDA"), a smartphone, a tablet PC or another portable device designed to communicate via a wireless network. The mobile device 180 in our example corresponds to a smartphone or tablet itself having network communication capability and a user interface, which in this discussion, may be used in the secure management of transactional histories for targeted content procedures.

The illustrated system example includes a mobile communication network 220, in this case, operated in accordance with 4G LTE standards. Mobile network 220 may provide mobile telephone communications as well as Internet data communication services. For example, mobile network 220 may connect to public packet-switched data communication networks such as the Internet 230 via PGW 223. Data communications via mobile network 220 provided for users of devices like 180 may support a variety of services such as communications of text and multimedia messages, e-mail, web browsing, streaming or downloading content, etc. with network connected equipment represented generically by content originator(s) 231 and/or redemption point(s) 232 in the drawing. Voice communication also may involve transport via the Internet 230 using voice over Internet Protocol (VoIP) technologies. Mobile device 180 may connect to mobile network 220 through a cellular base station 222, two of which appear in the drawing by way of example.

For convenience only, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB, and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G RANs, although such routing and control element(s) are generically included in the broad class of devices that may be used to implement the network functionality discussed here.

The carrier that operates the network 220 also utilizes a variety of other systems for related purposes, such as maintenance, accounting and provisioning. In the example, the carrier has another data network, e.g. Intranet 221, that provides data communications for other data systems used by the carrier; and that network 221 has connectivity into the network 220 that provides the actual communications services to the carrier's customers. For purposes of the present discussion, equipment communicating via the network 221 includes a trusted service manager (TSM) 228 that will be involved in the secure management of transactional histories for targeted content.

As described in greater detail below, system 200 allows various elements to interact in the distribution of targeted content, presentment of targeted content for redemption and secure management of transactional histories of targeted content. For example, one or more content originators 231 generate targeted content and deliver the targeted content to TSM 228. TSM 228, in turn, delivers the targeted content to one or more mobile devices, such as mobile device 180. Mobile device 180, in this example, transfers the targeted content to one or more additional mobile devices and/or presents the targeted content for redemption at one or more redemption points 232. Although FIG. 2 depicts content originator(s) 231 as connected to the Internet 230 and communicating with TSM 228 via carrier intranet 221, no such requirement exists. One or more content originators 231 may directly connect to carrier intranet 221 (not shown) and/or otherwise directly communicate with TSM 228.

Figure 3:
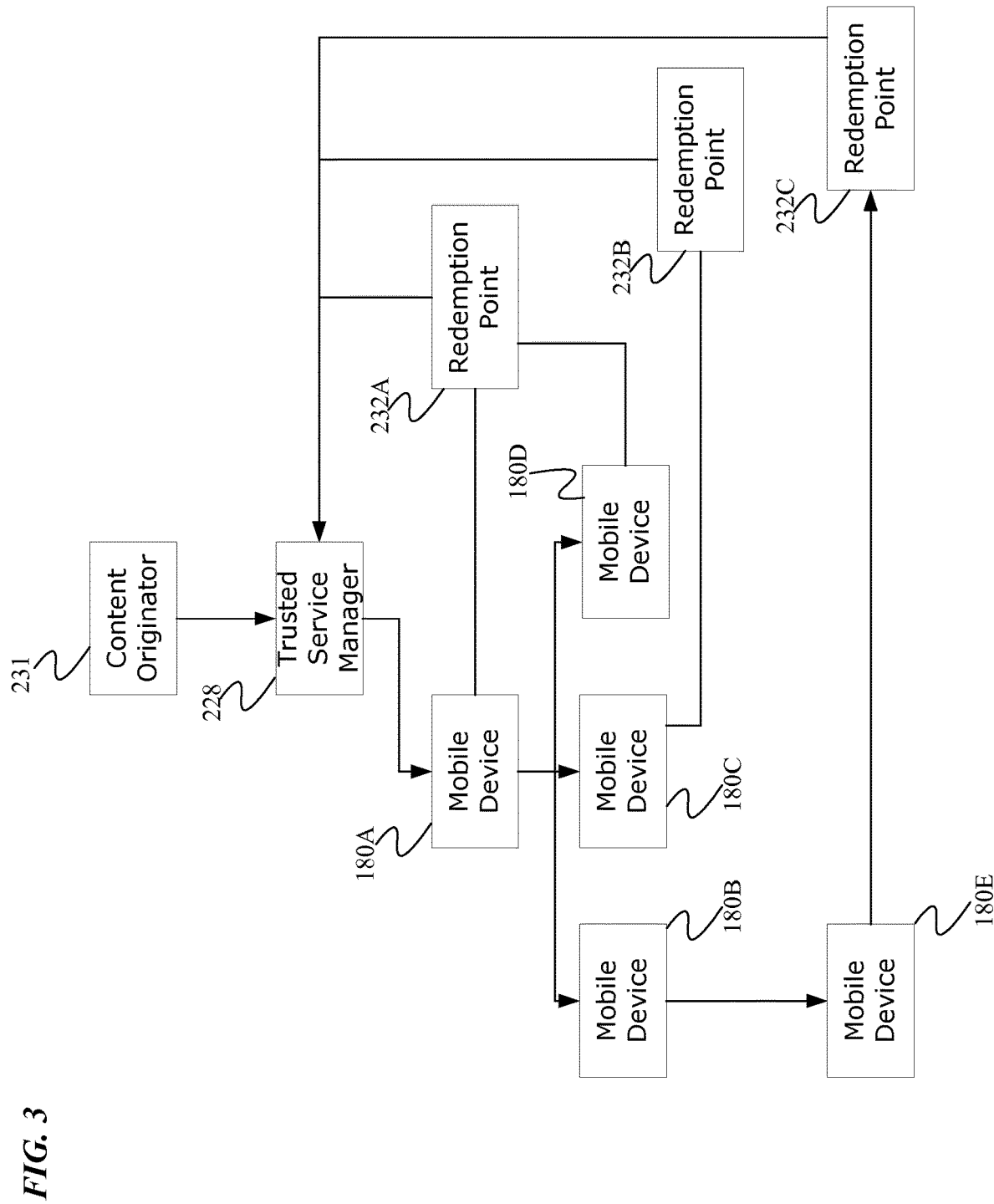
FIG. 3 is a functional block diagram of an example of elements involved in securely managing transactional histories for targeted content in a system similar to the system of FIG. 2.

FIG. 3 depicts a functional block diagram of an example of elements involved in securely managing transactional histories for targeted content in a system similar to the system of FIG. 2. In one example, content originator 231 generates targeted content and delivers the targeted content to TSM 228. Although FIG. 3 depicts a single content originator 231, no such requirement exists and any number of content originators 231 may generate any amount of targeted content for distribution as described herein. Depending upon the content traffic volume and/or agreements regarding security or the like, there may be any number of TSM platforms 228.

As discussed further below, targeted content is, for example, an ad, offer and/or other content for distribution to various mobile devices, such as mobile devices 180A-E of FIG. 3. Depending on content type, each content item is encoded in a suitable digital format, e.g. MP3 audio, JPEG image, MPEG video, etc. The targeted content is distributed, for example, within a secure content package, as described in greater detail below. In the example of FIG. 3, TSM 228 receives the targeted content from content originator 231 and delivers the targeted content to one or more mobile devices, such as mobile device 180A. Such targeted content delivery by TSM 228 is based, for example, on an existing request by one or more users of the corresponding mobile devices to receive such targeted content, a prior relationship between the one or more users and the content originator 231, a prior interest by the one or more users in related and/or unrelated content, a prior redemption and/or other interaction with similar content and/or any number of other criteria defining the one or more mobile devices targeted by content originator 231 and/or TSM 228 for delivery of the targeted content. In one example, TSM 228 delivers the targeted content to the one or more mobile devices securely via network 220. Delivery of the targeted content is triggered, for example, upon receipt of the targeted content from content originator 231 by TSM 228, upon establishment of a secure connection between TSM 228 and the one or more mobile devices via network 220, at a particular date, day and/or time (e.g., every Tuesday at 12:30 AM) and/or by any number of other criteria defining when targeted content delivery should occur.

Mobile device 180A, after receiving the targeted content, can present the targeted content for redemption, such as to redemption point 232A, and/or transfer the targeted content to one or more additional mobile devices, such as mobile devices 180B-D. Furthermore, the one or more additional mobile devices can further transfer the targeted content (e.g. mobile device 180B to mobile device 180E) and/or present the targeted content for redemption (e.g., mobile device 180D to redemption point 232A, mobile device 180C to redemption point 232B, mobile device 180E to redemption point 232C).

In one example, the targeted content is a coupon (e.g., fast food discount) and a user of mobile device 180A decides to share the coupon with a group of friends (e.g., users of mobile devices 180B-180C). Various users, in this example, choose to further share the coupon with other friends (e.g., users of mobile devices 180D-180E) and any number of users (e.g., users of mobile devices 180A, 180D-180E) present the coupon at the fast food restaurant.

As part of each transfer or redemption, a secure history container is updated, for example, to include a unique identifier and corresponding authentication token of the mobile device from which the transfer or presentation occurs as well as additional information related to the transfer or redemption (e.g., time, date, location, etc.). The secure history container is, for example, included with the targeted content as the targeted content is transferred or presented for redemption. That is, in one example, the receiving mobile device, such as mobile device 180D, receives the targeted content as well as the secure history container, including a unique identifier and corresponding authentication token of mobile device 180A, from mobile device 180A. In turn, in this example, when mobile device 180D presents the secure content for redemption to redemption point 232A, redemption point 232A receives the targeted content as well as the secure history container, including unique identifiers and corresponding authentication tokens of each of mobile device 180A and mobile device 180D.

Although redemption point(s) 232 (e.g., redemption point 232A-C in FIG. 3) is depicted as a server/computer hardware connected via Internet 230 in FIG. 2, this is only for simplicity and no such requirement exists. A redemption point 232 represents, in the various examples, a location, either physical or logical (e.g., website), where a user of a mobile device, such as mobile device 180, presents targeted content for redemption. In one example, redemption point 232 is a movie theater and the targeted content is a discounted movie ticket. In this example, a user of mobile device 180 presents the discounted movie ticket by displaying the ticket on display 120 of mobile device 180 and/or otherwise exchanging the ticket with a point of sale (POS) terminal at the theater. In an additional example, redemption point 232 is a check-out page of a website and the targeted content is a coupon code. In this additional example, a user of mobile device 180 presents the coupon code by entering the code using the various user interface elements of mobile device 180 (e.g., key(s) 130, touchscreen display 120, etc.) and/or otherwise including the coupon code in the check-out page prior to submitting the page for order processing.

Figure 4:
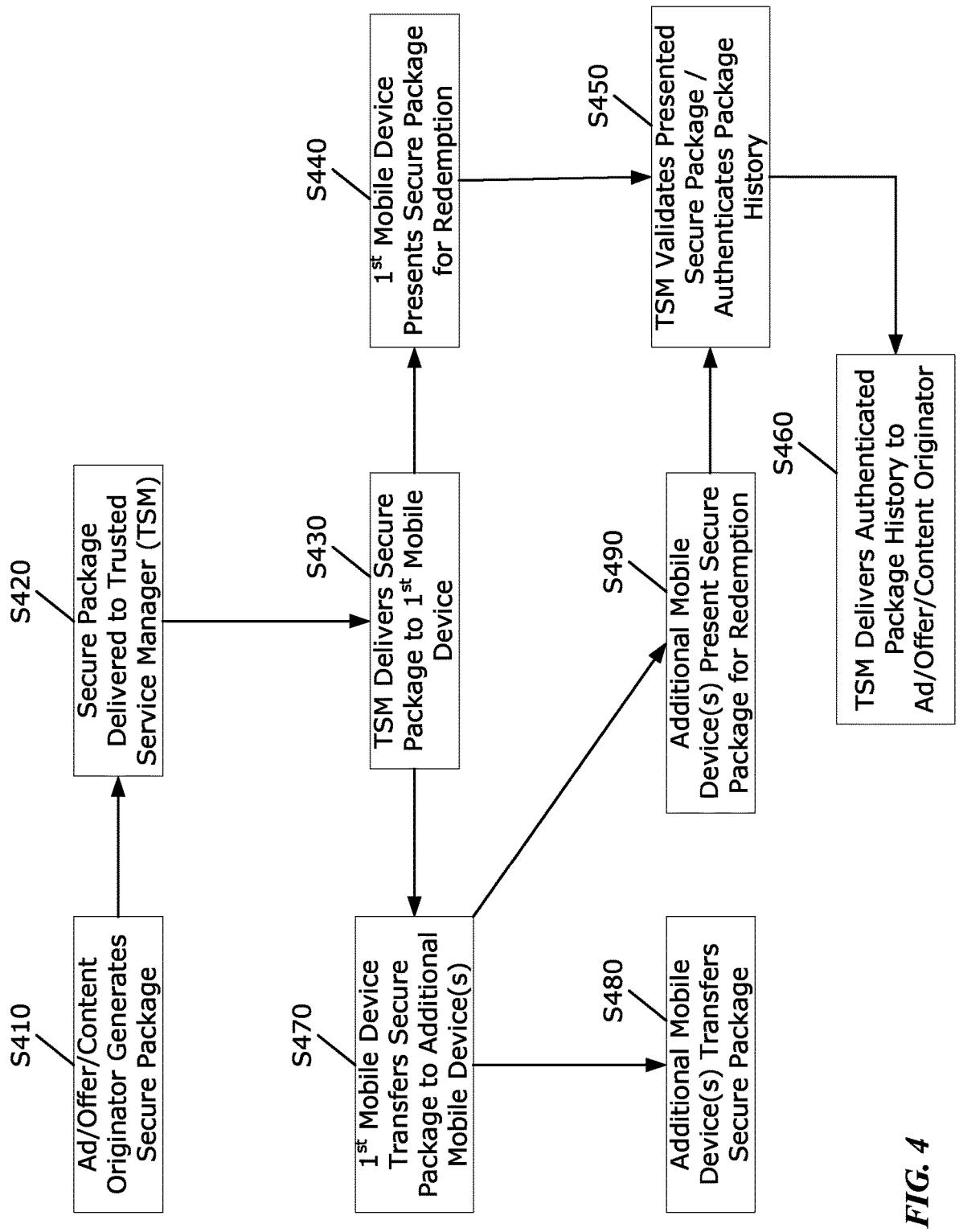
FIG. 4 is a flow diagram of an example of steps involved in transferring and redeeming a secure content package.

FIG. 4 depicts an example of a process flow for generating, delivering, transferring and redeeming a secure content package including a secure history container. Although the steps of the process are referenced with sequential reference numbers, no such order of steps is required and various steps may be performed in any order and/or repeatedly performed, as described in greater detail below.

In step S410, content originator 231, for example, creates targeted content to be distributed to targeted consumers, such as a user of mobile device 180, and generates a secure package containing the targeted content. In one example, content originator 231 is a business, retailer, advertiser and/or marketer and the targeted content is an ad, coupon or discount offer and/or other promotional content. Targeted content may take any one or some combination of various forms or formats, such as an image, a video, audio and/or other data. For example, the targeted content is a coupon intended to induce a user to present the coupon for redemption in conjunction with a purchase or other transaction of a product and/or service. The product and/or service may be offered by either content originator 231 or some other business, organization, group or individual. Furthermore, the purchase or other transaction may be handled either directly by content originator 231 or the other entity or individual offering the product and/or service, or indirectly via yet some additional business, organization, group or individual. Content originator 231 generates the secure content package, for example, by creating a signature of the targeted content and combining the targeted content and signature together in the secure content package.

The secure content package, in step S420, is delivered to TSM 228 in one example. TSM 228 is, for example, a server within carrier intranet 221, as described in greater detail above, and such delivery occurs as a secure communication between content originator 231 and TSM 228 via Internet 230 and carrier intranet 221. Alternatively, or in addition, TSM 228 may be provided and/or maintained by another third party and accessible via carrier intranet 221 and/or Internet 230.

In one example, TSM 228 securely communicates with mobile device 180 via mobile communication network 220 in order to deliver the secure content package to mobile device 180 in step S430. As part of step S430, for example, mobile device 180 stores the secure content package in a secure element of mobile device 180. For example, mobile device 180 stores the secure content package in SIM 160, SE 137 or TEE. After mobile device 180 receives and securely stores the secure content package in the secure element, mobile device 180 may present the secure content package for redemption, as described below in relation to step S440. Alternatively, or in addition, mobile device 180 may transfer the secure content package to one or more additional mobile devices, as described below in relation to step S470.

In step S440, mobile device 180 presents the secure content package for redemption. For example, mobile device 180 presents the secure content package at redemption point 232. Redemption point 232 is, for example, a physical or logical location, as described in greater detail above, where a user of mobile device 180 may conduct a purchase or other transaction related to the targeted content.

As part of presenting the secure content package for redemption, mobile device 180, for example, updates a secure history container of the secure content package. In one example, the secure history container is part of the secure content package when the mobile device 180 receives the secure content package from the TSM in step S430. For example, the secure history container is created when the secure content package is created by content originator 231 or the secure history container is added to the secure content package by the TSM 228. In an alternate example, mobile device 180, as the first mobile device to receive the secure content package, creates the secure history container and updates the secure history container to be part of the secure content package. Thus, to update, in the various examples, is defined to be creating and/or changing.

The secure history container includes one or more entries of information. Each entry corresponds to a mobile device from which the targeted content is transferred or presented (e.g., mobile device 180) and includes a unique identifier of the mobile device. Each entry also includes other information, such as an event prompting creation of the entry (e.g., presentation for redemption, transfer), a location of the event (e.g., redemption point 232, physical location, logical address), and/or additional information (e.g., device type, timestamp). In one example, the unique identifier is a mobile directory number (MDN) of the mobile device. Alternatively, or in addition, the unique identifier is an international mobile equipment identity (IMEI) and/or an international mobile subscriber identity (IMSI). Each entry also includes an authentication token corresponding to the unique identifier. As an example, the authentication token is a hash of the unique identifier (e.g., MDN, IMEI and/or IMSE) generated utilizing a key shared in common between the mobile device, such as mobile device 180, and TSM 228.

As part of step S440 then, mobile device 180, for example, updates the secure history container of the secure content package to include a unique identifier of mobile device 180, an authentication token corresponding to the unique identifier, as well as other information corresponding to mobile device 180 presenting the secure content package for redemption (e.g., a timestamp, redemption point 232, presentation for redemption).

In step S450, TSM 228, for example, validates the presented secure content package and authenticates the secure history container of the secure content package. In one example, TSM 228 validates the presented secure content package by determining if the presented secure content package corresponds to the secure content package delivered to mobile device 180 by TSM 228 in step S430. If the presented secure content package corresponds to the delivered secure content package, the presented secure content package is valid. For example, TSM 228 verifies the signature of the presented secure content package matches the signature of the secure content package TSM 228 delivered to mobile device 180 in step S430.

In a further example, TSM 228 authenticates the secure history container of the presented secure content package by determining if each entry in the secure history container is authentic. For example, TSM 228 generates a hash of the respective unique identifier in each secure history container entry utilizing the respective key shared in common between TSM 228 and the respective mobile device, such as mobile device 180. TSM 228, in this example, then compares the generated hash with the respective authentication token from the respective secure history container entry. If the generated hash and the respective authentication token match, the respective secure history container entry is authentic. If each of the secure history container entries is authentic, TSM 228 authenticates the secure history container. Although the previous example depicts authenticating each and every entry in the secure history container, no such requirement exists. By authenticating each and every entry, TSM 228 can ensure only authorized mobile devices were involved in the distribution and further transfer of targeted content as well as presenting the targeted content for redemption. Authenticating only some subset (e.g., last, first and last, randomly selected), however, allows TSM 228 to ensure the corresponding mobile device(s) is authorized to perform the corresponding event (e.g., transfer, redemption).

Upon validating the presented secure content package and authenticating the secure history container of the presented secure content package, TSM 228, in step S460, delivers the authenticated secure history container, for example, to the content originator 231 as a record of the redemption. Because the secure history container includes a unique identifier of the mobile device, such as mobile device 180, presenting the secure content package for redemption allows content originator 231 to more effectively manage the targeted content within the secure content package.

As discussed above, the first mobile device, such as mobile device 180, presents the secure content package for redemption in step S440. Alternatively, or in addition, the first mobile device, such as mobile device 180, can transfer the secure content package to one or more additional mobile devices, in step S470. For example, the user of mobile device 180 decides to share the secure content package with a friend, who is a user of an additional mobile device. Such transfer(s) occurs, for example, in any number of ways, such as via e-mail, short message service (SMS) or some other file transfer method. In one example, near field communications (NFC) capabilities are utilized to establish a channel of communication between the first mobile device and the additional mobile device. In this example, the two devices are brought into close proximity, a channel of communication is established via NFC and the first mobile device sends the secure content package to the additional mobile device, based on NFC establishment, application activity and/or user involvement, such as the user selecting an option to transfer the content via a user interface of one of the mobile devices. Upon receipt of the secure content package, the additional mobile device stores the secure content package in a secure element of the additional mobile device.

As part of step S470, similar to step S440, the first mobile device, such as mobile device 180, updates the secure history container of the secure content package prior to transferring the targeted content. For example, the first mobile device inserts a secure history container entry including a unique identifier of the first mobile device and corresponding authentication token into the secure history container.

In step S480, the additional mobile device(s), for example, transfers the secure content package to yet another additional mobile device. As part of the additional transfer, the additional mobile device also updates the secure history container, for example, with a secure history container entry including a unique identifier of the additional mobile device and corresponding authentication token. In this way, each secure content package stored within a secure element of a mobile device includes a secure history container and the secure history container includes an entry corresponding to each mobile device involved in the distribution of the secure content package to that particular mobile device. Each secure history container entry includes a respective unique identifier and corresponding respective authentication token for each respective mobile device as well as other information corresponding to the respective mobile device, transfer and/or location.

Alternatively, or in addition, the additional mobile device(s), in step S490, presents the secure package for redemption. As part of step S490, similar to steps S440 and S470, the additional mobile device updates the secure history container to include an entry corresponding to the additional mobile device. As such, the secure history container, as a result of step S490 and similar to a result of step S480, includes multiple secure history container entries (e.g., one entry corresponding to the first mobile device and one entry corresponding to the additional mobile device).

Upon presenting the secure content package for redemption, steps S450 and S460 are performed, as described above. In this way, content originator 231 receives not only information about a particular redemption of the targeted content, but detailed information about the distribution of the targeted content. This detailed information (e.g., mobile device unique identifier(s), timestamp(s), event(s), location(s)) allows content originator 231 to more effectively and efficiently develop future targeted content and manage the distribution of such future targeted content.

In one example, content originator 231, based on information provided in a secure history container from one content redemption as well as secure history containers from all redemptions of the content, can determine "who" is redeeming the content; how the "redeemer" received the content; and to "whom" content is being transferred. Over time, content originator 231 may also compare secure history containers from redemptions of one content package (e.g., first coupon code) with secure history containers from redemptions of another content package (e.g., second coupon code) and/or various other content packages. In this way, content originator 231 determines, for example, that mobile device users with a particular characteristic (e.g., age range, device type, online redemption vs. physical redemption) respond differently to different types of content (e.g., image, short video, text, amount and/or type of discount). Content originator 231 may then tailor future content targeted to that particular characteristic in one way while tailoring other future content targeted to a different characteristic in a different way.

In a further example, content originator 231 determines that mobile device users with a particular characteristic (e.g., age range, device type, relationship status) transfer different types of content differently. For example, a parent transfers one type of content to a child(ren), a second type of content to a spouse and a third type of content to both a spouse and child(ren). In turn, the child may exchange the first content type with friends who are of a similar age and further transfer the first content type only to other friends. At the same time, the child may exchange the third content type with friends who are of a similar age, but that further transfer the third content type with friends and parents. Likewise, the spouse may transfer the second content type to friends who further transfer the second content type to spouses and/or friends. By capturing appropriate information in the secure history container, content originator 231 can tailor content not only based on redemptions, but also based on distributions.

Although not explicitly depicted in FIG. 4, the secure content package is data stored in a secure element of a mobile device, such as mobile device 180. As such, when the secure content package is transferred and/or presented for redemption, in various examples, a copy of the data is created. In this way, each of the various mobile devices, for example, stores a copy of the secure content package within the respective secure element of the respective mobile device, but each copy contains the same targeted content as originally generated by the content originator 231. At the same time, however, each copy of the secure content package stored by each of the various mobile devices includes, for example, a potentially different secure history container or no secure history container at all, depending on how the secure content package was delivered to the respective mobile device (e.g., from TSM 228 or another mobile device). Furthermore, because each mobile device, such as mobile device 180, stores a copy of the secure content package in a respective secure element and retains, for example, the copy after performing a step, such as steps S440 and S470, any one of the steps depicted in FIG. 4 may be performed any number of times.

Alternatively, or in addition, the secure content package includes, for example, information related to the ability of a particular mobile device, such as mobile device 180, to store and retain the secure content package. For example, the secure content package can only be presented for redemption once by each mobile device or each mobile device can only present the secure content package for redemption once at each POS location 232. Furthermore, each mobile device, for example, can only transfer the secure content package to some number of other mobile devices or is unable to transfer the secure content package to any other mobile device. For example, such limitations on redemption and/or transfer are implemented via one or more digital rights management regimes, counters and/or flags contained within the secure content package, and/or any number of other mechanisms used to impose such limitations.

As shown by the discussion above, aspects of the secure management of transactional histories of targeted content techniques may be implemented by appropriate programming of a mobile device and/or one or more server computers. FIG. 1 and the discussion thereof covered an example of a mobile device that may utilize relevant client side programming. It may be helpful to briefly consider computer platforms that may utilize relevant server side programming.

Figure 5:
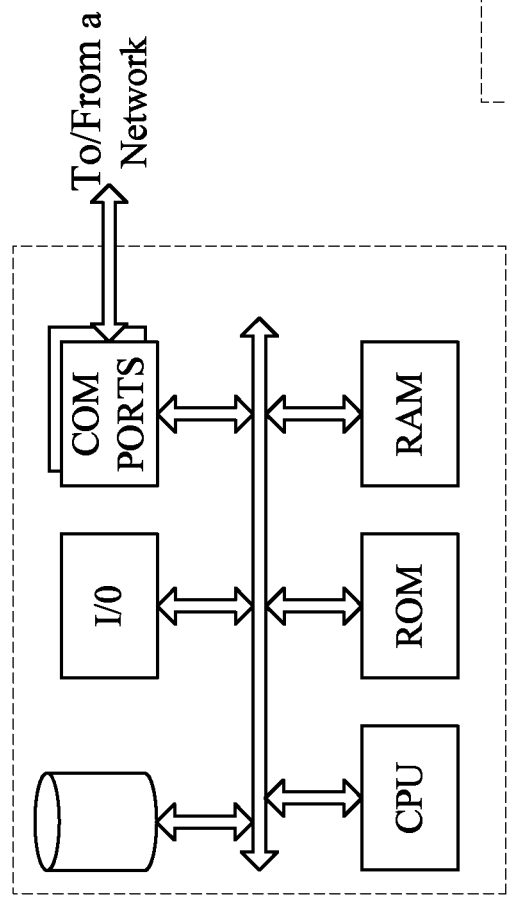
FIG. 5 provides a block diagram of a general purpose computer hardware platform that may be configured as a host or server, for example, to function as any of the server computers shown in FIG. 2.
Figure 6:
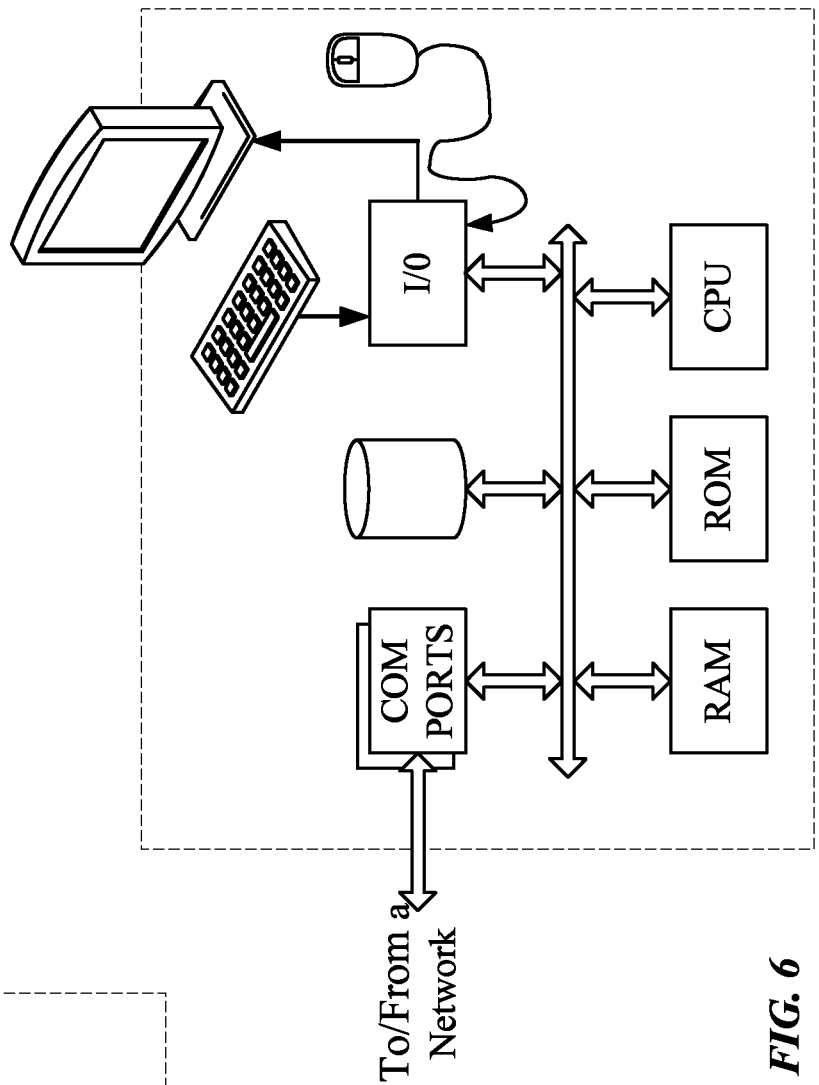
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server, for example, such as that of the content originator 231 or the trusted service manager 228. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A computer for use as a server, for example, includes a data communication interface for packet data communication (see FIG. 5). The server also includes a central processing unit (CPU), in the form of one or more processors, for executing program instructions. Although processor(s) forming the CPU may be similar to the microprocessor used in the mobile device of FIG. 2, host or server computer platforms typically use somewhat different circuit architectures, e.g. to provide more processor power. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to secure management of transactional histories of targeted content techniques discussed herein may be downloaded and/or updated from a computer platform, for example, to configure the TSM or other server (e.g. FIG. 2) or from a host computer or the like communicating with the mobile device (e.g. FIG. 1) via the network (e.g. FIG. 2).

A computer type user terminal device, such as a PC or tablet computer, similarly includes a data communication interface, CPU, main memory and one or more mass storage devices for storing user data and the various executable programs (see FIG. 6). Although processor(s) forming the CPU may be similar to the microprocessor used in the mobile device of FIG. 2, host or server computer platforms typically use somewhat different circuit architectures, e.g. to provide more processor power. A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of secure management and related communications outlined above may be embodied in programming. Program aspects of the technology may be thought of as "products" or "articles of manufacture" typically in the form of executable code and/or associated list data that is carried on or embodied in a type of machine readable medium. Executable code, for example, may take the form of software, firmware, microcode, or the like of the type suitable for execution by the particular processor hardware of the mobile device, other user terminal device or server platform, so as to configure the respective equipment to perform functions like those discussed herein.

"Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a memory to store instructions; and
a processor, to execute the instructions in the memory, to:
    receive, from an originator device, a first secure content package,
        the first secure content package including targeted content for distribution to a plurality of mobile devices in a wireless mobile communications network, and
        the originator device to generate the first secure content package by creating a first signature of the targeted content and combining the targeted content and the first signature together in the first secure content package;
    send, to a first mobile device, of the plurality of mobile devices, and via the wireless mobile communications network, the first secure content package,
        the first secure content package being sent to the first mobile device based on a prior redemption of content, that is similar to the targeted content, by the first mobile device;
    receive, from a second mobile device of the plurality of mobile devices, a second secure content package as the targeted content is presented for redemption,
        the second secure content package including the targeted content and a first secure history container with a second signature,
            the first secure history container including:
                a first unique identifier entry corresponding to the first mobile device, and
                a second unique identifier entry corresponding to the second mobile device, the first secure content package being transferred to the second mobile device via the first mobile device;
determine that the second secure content package is valid when the first secure content package corresponds to the second secure content package,
the second secure content package is valid when the first signature matches the second signature;
generate, utilizing a common key, a hash associated with at least one of the first unique identifier entry or the second unique identifier entry,
the common key being shared between at least one of the first mobile device or the second mobile device;
determine that at least one of the first unique identifier entry or the second unique identifier entry, within the first secure history container, is authentic based on comparing the hash to an authentication token associated with the at least one of the first unique identifier entry or the second unique identifier entry;
provide, based on determining that the second secure content package is valid and that the at least one of the first unique identifier entry or the second unique identifier entry is authentic, the first secure history container to the originator device as a first record of redemption of the second secure content package,
the first secure history container providing information about a distribution of the targeted content between the first mobile device and the second mobile device;
receive, from a third mobile device of the plurality of mobile devices, a third secure content package as the targeted content is presented for redemption,
the third secure content package including the targeted content and a second secure history container,
the second secure history container including:
a third unique identifier entry corresponding to the first mobile device, and
a fourth unique identifier entry corresponding to the third mobile device,
the first secure content package being transferred to the third mobile device via the first mobile device;
determine that the third secure content package is valid when the first secure content package corresponds to the third secure content package; and
provide, based on determining that the third secure content package is valid, the second secure history container to the originator device as a second record of redemption of the third secure content package,
the second secure history container providing information about a distribution of the targeted content between the first mobile device and third mobile device,
the originator device to utilize the information about the distribution of the targeted content between the first mobile device and the second mobile device and the information about the distribution of the targeted content between the first mobile device and the third mobile device, to develop future targeted content and manage distribution of the future targeted content.

2. The device of claim 1, wherein the processor is further to: compare the second secure content package with the first secure content package.

3. The device of claim 1, wherein the processor is further to:
retrieve the first signature from the first secure content package and the second signature from the second secure content package;
compare the first signature and the second signature; and
determine that the first secure content package corresponds to the second secure content package based on comparing the first signature and the second signature.

4. The device of claim 1, wherein the processor is further to:
retrieve, from the at least one of the first unique identifier entry or the second unique identifier entry, the authentication token; and
determine whether the authentication token is authentic.

5. The device of claim 4, wherein the processor is further to:
determine that the authentication token is authentic when the hash corresponds to the authentication token.

6. A method, comprising:
receiving, by a device and from an originator device, a first secure content package,
the first secure content package including targeted content for distribution to a plurality of mobile devices in a wireless mobile communications network, and
the originator device to generate the first secure content package by creating a first signature of the targeted content and combining the targeted content and the first signature together in the first secure content package;
sending, by the device and to a first mobile device, of the plurality of mobile devices, via the wireless mobile communications network, the first secure content package,
the first secure content package being sent to the first mobile device based on a prior redemption of content, that is similar to the targeted content, by the first mobile device;
receiving, by the device and from a second mobile device of the plurality of mobile devices, a second secure content package as the targeted content is presented for redemption,
the second secure content package including the targeted content and a first secure history container with a second signature,
the first secure history container including:
a first unique identifier entry corresponding to the first mobile device, and
a second unique identifier entry corresponding to the second mobile device, of the plurality of mobile devices,
the first secure content package being transferred to the second mobile device via the first mobile device;
determining, by the device, that the second secure content package is valid when the first secure content package corresponds to the second secure content package,
the second secure content package is valid when the first signature matches the second signature;
generating, by the device and utilizing a common key, a hash associated with at least one of the first unique identifier entry or the second unique identifier entry,
the common key being shared between at least one of the first mobile device or the second mobile device, and the device;

determining, by the device, that at least one of the first unique identifier entry or the second unique identifier entry, within the first secure history container, is authentic based on comparing the hash to an authentication token associated with the at least one of the first unique identifier entry or the second unique identifier entry; providing, by the device, based on determining that the second secure content package is valid and that the at least one of the first unique identifier entry or the second unique identifier entry is authentic, the first secure history container to the originator device as a first record of redemption of the second secure content package, the first secure history container providing information about a distribution of the targeted content between the first mobile device and the second mobile device;

receiving, by the device and from a third mobile device of the plurality of mobile devices, a third secure content package as the targeted content is presented for redemption, the third secure content package including the targeted content and a second secure history container, the second secure history container including:
a third unique identifier entry corresponding to the first mobile device and
a fourth unique identifier entry corresponding to the third mobile device,
the first secure content package being transferred to the third mobile device via the first mobile device;

determining, by the device, that the third secure content package is valid when the first secure content package corresponds to the third secure content package; and providing, by the device, based on determining that the third secure content package is valid, the second secure history container to the originator device as a second record of redemption of the third secure content package, the second secure history container providing information about a distribution of the targeted content between the first mobile device and the third mobile device,
the originator device to utilize the information about the distribution of the targeted content between the first mobile device and the second mobile device, and the information about the distribution of the targeted content between the first mobile device and the third mobile device to develop future targeted content and manage distribution of the future targeted content.

7. The method of claim 6, wherein the first unique identifier entry comprises:
a unique identifier of the first mobile device; and
the authentication token associated with the unique identifier.

8. The method of claim 7, wherein:
the unique identifier is a mobile directory number of the first mobile device; and
the authentication token is a hash of the mobile directory number generated utilizing the common key.

9. The method of claim 6, further comprising:
retrieving the first signature from the first secure content package and the second signature from the second secure content package;
comparing the first signature and the second signature; and determining that the first secure content package corresponds to the second secure content package based on comparing the first signature and the second signature.

10. The method of claim 9, wherein the first secure content package includes an empty secure history container.

11. The method of claim 6, further comprising:
comparing the first secure content package and the second secure content package when determining that the second secure content package is valid.

12. The method of claim 6, where providing the second secure history container comprises:
providing the second secure history container based on determining that the third unique identifier entry or the fourth unique identifier entry is authentic based on comparing a hash of a unique identifier generated when the third secure content package is presented for redemption with a hash generated when the third secure content package was transferred and included in the second secure history container.

13. A non-transitory computer-readable medium for storing instructions, the instructions comprising:
one or more instructions that, when executed by one or more processors of a device, cause the one or more processors to:
receive, from an originator device, a first secure content package,
the first secure content package including targeted content for distribution to a plurality of mobile devices in a wireless mobile communications network, and
the originator device to generate the first secure content package by creating a first signature of the targeted content and combining the targeted content and the first signature together in the first secure content package;
send, to a first mobile device, of the plurality of mobile devices, and via the wireless mobile communications network, the first secure content package,
the first secure content package being sent to the first mobile device based on a prior redemption of content, that is similar to the targeted content, by the first mobile device;
receive, from a second mobile device of the plurality of mobile devices, a second secure content package as the targeted content is presented for redemption,
the second secure content package including the targeted content and a first secure history container with a second signature,
the first secure history container including:
a first unique identifier entry corresponding to the first mobile device, and
a second unique identifier entry corresponding to the second mobile device,
the first secure content package being transferred to the second mobile device via the first mobile device;
determine that the second secure content package is valid when the first secure content package corresponds to the second secure content package,
the second secure content package is valid when the first signature matches the second signature;
generate, utilizing a common key, a hash associated with at least one of the first unique identifier entry or the second unique identifier entry,
the common key being shared between at least one of the first mobile device or the second mobile device, and the device;

determine that at least one of the first unique identifier entry or the second unique identifier entry, within the first secure history container, is authentic based on comparing the hash to an authentication token associated with the at least one of the first unique identifier entry or the second unique identifier entry;

provide, based on determining that the second secure content package is valid and that the at least one of the first unique identifier entry or the second unique identifier entry is authentic, the first secure history container to the originator device as a first record of redemption of the second secure content package,
the first secure history container providing information about a distribution of the targeted content between the first mobile device and the second mobile device;

receive, from a third mobile device of the plurality of mobile devices, a third secure content package as the targeted content is presented for redemption,
the third secure content package including the targeted content and a second secure history container,
the second secure history container including:
a third unique identifier entry corresponding to the first mobile device and
a fourth unique identifier entry corresponding to the third mobile device,
the first secure content package being transferred to the third mobile device via the first mobile device;

determine that the third secure content package is valid when the first secure content package corresponds to the third secure content package; and provide, based on determining that the third secure content package is valid, the second secure history container to the originator device as a second record of redemption of the third secure content package,
the second secure history container providing information about a distribution of the targeted content between the first mobile device and the third mobile device,
the originator device to utilize the information about the distribution of the targeted content between the first mobile device and the second mobile device and the information about the distribution of the targeted content between the first mobile device and the third mobile device, to develop future targeted content and manage distribution of the future targeted content.

14. The non-transitory computer-readable medium of claim 13, wherein the first unique identifier entry comprises:
a unique identifier of the first mobile device; and
an authentication token corresponding to the unique identifier.

15. The non-transitory computer-readable medium of claim 14, wherein:
the unique identifier is a mobile directory number of the first mobile device; and
the authentication token is a hash of the mobile directory number generated utilizing the common key.

16. The non-transitory computer-readable medium of claim 13,
wherein the instructions further comprise: one or more instructions that, when executed by the one or more processors, cause the one or more processors to:
retrieve the first signature from the first secure content package and the second signature from the second secure content package;
compare the first signature and the second signature; and
determine that the first secure content package corresponds to the second secure content package based on comparing the first signature and the second signature.

17. The non-transitory computer-readable medium of claim 16, wherein the first secure content package includes an empty secure history container.

18. The non-transitory computer-readable medium of claim 13, wherein the second secure content package is received from the second mobile device using near-field communication.

19. The non-transitory computer-readable medium of claim 13, wherein the instructions further comprise:
one or more instructions that, when executed by the one or more processors, cause the one or more processors to:
compare the first secure content package and the second secure content package when determining that the second secure content package is valid.

20. The non-transitory computer-readable medium of claim 13, where the one or more instructions, that cause the one or more processors to provide the second secure history container, cause the one or more processors to:
provide the second secure history container based on determining that the third unique identifier entry or the fourth unique identifier entry is authentic based on comparing a hash of a unique identifier generated when the third secure content package is presented for redemption with a hash generated when the third secure content package was transferred and included in the second secure history container.

* * * * *